Oct. 29, 1963     H. F. MALONE ETAL     3,109,078
COMBINATION MOTOR START RELAY AND OVERLOAD PROTECTOR
Filed Sept. 1, 1961     2 Sheets-Sheet 1

INVENTORS.
Homer F. Malone.
Stewart W. Drennan.
BY
Harness, Dickey & Pierce.
ATTORNEYS.

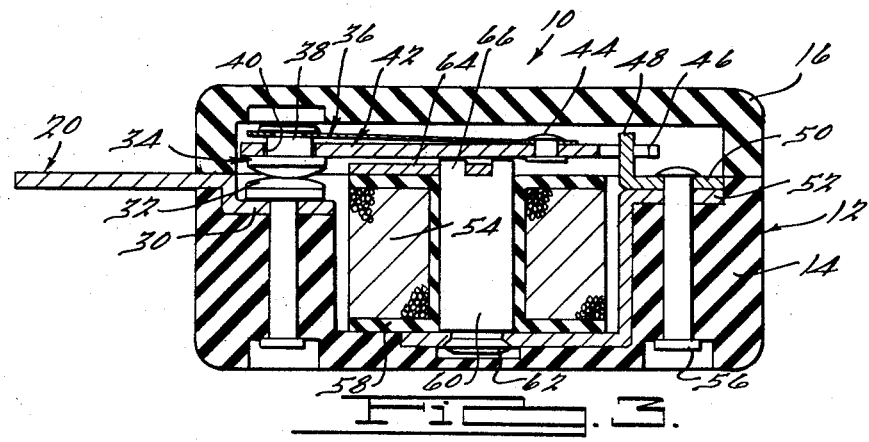
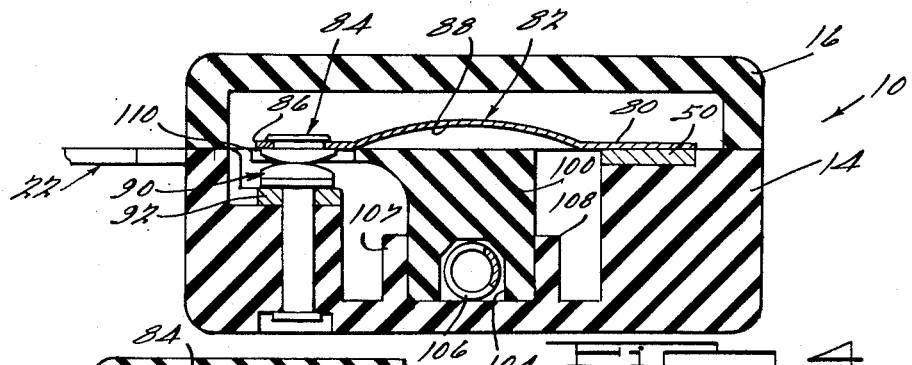
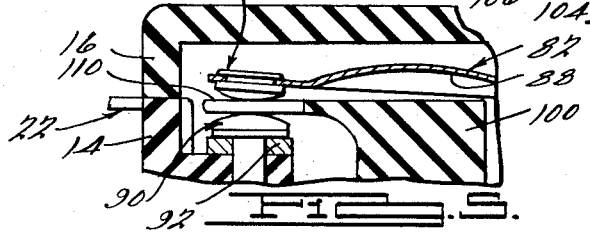
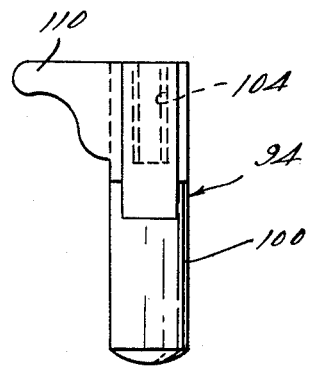
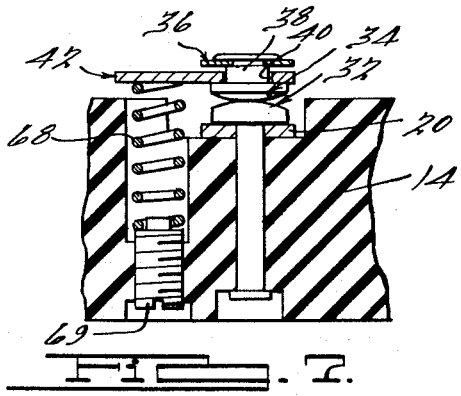

United States Patent Office 3,109,078
Patented Oct. 29, 1963

3,109,078
COMBINATION MOTOR START RELAY AND OVERLOAD PROTECTOR
Homer F. Malone, Jackson, and Stewart W. Drennan, Munith, Mich., assignors to Mechanical Products, Inc., Jackson, Mich., a corporation of Michigan
Filed Sept. 1, 1961, Ser. No. 135,481
1 Claim. (Cl. 200—88)

This invention relates to an improved combination motor start relay and overload protector.

It is well known that current flow in the main winding of a split phase or capacitor split phase motor is relatively large upon starting of the motor or when the motor is running in the heavily loaded condition. However, when the motor operates at its rated speed and load, current in the main winding thereof is reduced to the normal current rating of the motor.

Preferably, starting relays for such electrical motors are responsive to the above noted electrical condition in the main windings of a motor to effect energization of the start or phase winding of the motor. Thus, upon starting or if a motor slows down because of a heavy load, relatively large current flow in the main winding should effect energization of the phase winding to bring the motor up to the speed at which time the phase winding should be deenergized.

Such motors must also be protected against current overload due to, for example, continuing excessive loads on the motor. Such a current responsive protector must, of course, be responsive to only sustained current overloads as differentiated crom the aforesaid relatively high starting currents. Also, upon the occurrence of a current overload, the current responsive member is preferably locked out to preclude subsequent damage to the main motor windings.

A combination motor start relay and overload protector, in accordance with the instant invention, is responsive to the aforementioned electrical conditions with a heretofore unknown degree of accuracy. Such accuracy is obtained by combining a magnetic start relay with a current responsive bimetal in a unitized or common housing so as to be in relatively compact heat exchange relationship. This structural orientation of magnetic and thermo-responsive elements also renders the combination motor start relay and overload protector practicable for integration into a motor housing.

Accordingly, one object of the instant invention is an improved motor start relay and overload protector.

Another object is a magnetic motor start relay and thermo-responsive overload protector that are unitized and enclosed in heat exchange relationship.

Another object is a combination motor start relay and overload protector having a minimum number of structural components.

Other objects and advantages of the instant invention will be apparent from the following specification, claim and drawings wherein:

FIG. 3 is a cross-sectional view taken substantially along the line 3—3 of FIG. 2;

FIG. 4 is a cross-sectional view taken substantially along the line 4—4 of FIG. 2;

FIG. 5 is a fragmentary view similar to FIG. 4 showing the overload contacts in the tripped and locked-out condition.

FIG. 6 is a top view of the lock-out plate and reset button for the overload contacts; and FIG. 7 is a cross-sectional view taken substantially along the line 7—7 of FIG. 2.

Figure 2:
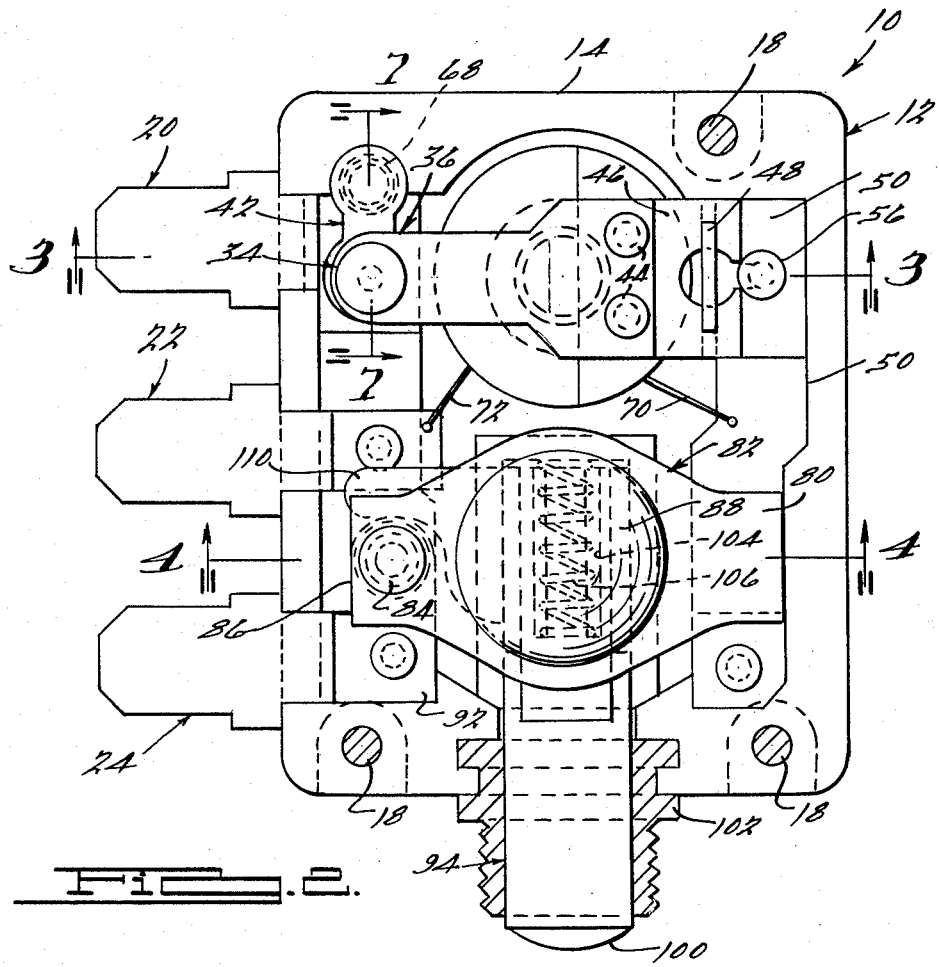
FIG. 2 is a top view of the motor start relay and overload protector with the cover thereof removed.

As best seen in FIG. 2, a combination motor start relay and overload protector 10, in accordance with an exemplary embodiment of the present invention, comprises a housing 12 including a base portion 14 and a cover portion 16. The cover portion 16 is secured to the base portion 14 by a plurality of rivets 18. A plurality of terminals 20, 22 and 24 extend exteriorly of the housing 12 for connection to a source of electrical energy and to the start and run windings 26 and 27, respectively, of an electrical motor 28, as will be described.

As best seen in FIG. 3, the terminal 20 has an inner end portion 30 with an electrical contact 32 thereon in operative alignment with a movable contact 34. The movable contact 34 is fixedly secured to a contact spring 36. The contact 34 has a cylindrical portion 38 that extends through a complementary aperture 40 in a magnetic armature 42 thereby to provide for lost motion movement with respect to the armature 42. The contact spring 36 is secured to the armature 42 as by a pair of rivets 44. An end portion 46 of the armature 42 is supported on an upstanding portion 48 of a plate 50, the plate 50 being made of magnetic material to function, in combination with a plate 52 that underlies a magnetic coil 54, as a flux return path. The plates 50 and 52 and associated assembly are retained with respect to the base portion 14 of the housing 12 as by a rivet 56.

The coil 54 is wound on an insulating spool 58 and has a central core 60 of, for example, magnetic material, such as iron. An end portion 62 of the core 60 is secured to the plate 52, as by riveting. A shading coil 64 is secured to an upper end portion 66 of the core 60 in the conventional manner.

Movement of the armature 42 toward the core 60, against the bias of an armature return spring 68 (FIG. 7), upon the occurrence of a predetermined current and therefore magnetic flux in the coil 54 and core 60, respectively, effects downward movement of the contact 34 into electrical engagement with the fixed contact 32. The pressure of spring 68 can be adjusted to the "pull in" and "drop out" current characteristics of the motor to which the combination motor start relay and overload protector is being adapted, by advancing or retracting an adjustment screw 69.

At such time as the current in the coil 54 and flux in the core 60 is reduced to a predetermined normal or rated current, the armature return spring 68 biases the armature 42 upwardly with respect to the coil 54 and core 60 as seen in FIG. 3. The contact spring 36 provides for lost motion between the contact 34 and armature 42 which maintains the contacts 32 and 34 in engagement until such time as the armature does, in fact, move completely away from the core 60. This lost motion arrangement precludes spurious drop out or separation of the contacts 34 and 32 with its inherent deleterious effects on the contacts 32 and 34.

Electrical continuity through the coil 54 is effected by a terminal end portion 70 (FIG. 2) of the coil 54 that is connected to the plate 50 and by an opposite terminal end portion 72 that is electrically connected to the terminal 22.

The plate 50 supports an end portion 80 of a current responsive bimetal 82. An electrical contact 84 is secured to an opposite end portion 86 of the bimetal 82 as by riveting. The bimetal 82 has a dished center portion 88 that effects snap-action thereof in the conventional manner.

The contact 84 is aligned and engageable with a fixed contact 90 that is supported on an inner end portion 92 of the terminal 24.

A manual operator 94 having an end portion 100 that functions as a reset button is slidably supported in a complementary sleeve 102 for movement axially thereof. The manual operator 94 has a longitudinal cavity 104 theerin for the acceptance of a helical compression spring 106 that normally biases the operator 94 axially outwardly of the sleeve 102 and housing 12. The operator 94 is guided for such movement by a pair of upstanding walls 107 and 108 in the base portion 14 of the housing 12, as well as by the sleeve 102.

The manual operator has a generally plate-like inner end portion 110 extending laterally thereof, that normally engages the movable contact 84 on the bimetal 82 thereby to preclude outward movement of the operator 94 under the bias of the spring 106. Upon separation of the contacts 84 and 90 due to, for example, the occurrence of a current overload in the main winding 27 of the motor 28, the end portion 110 of the operator 94 moves between the contacts 84 and 90 thereby to preclude closure of the contacts 84 and 90 even though the current overload is eliminated and the bimetal 82 cools sufficiently to return to its normal configuration. Thus, movement of the end portion 110 between the contacts 84 and 90 requires that the combination motor start relay and overload protector 10 be manually reset as by pushing the button portion 100 of the operator 94 axially inwardly of the sleeve 102 and housing 12.

Figure 1:
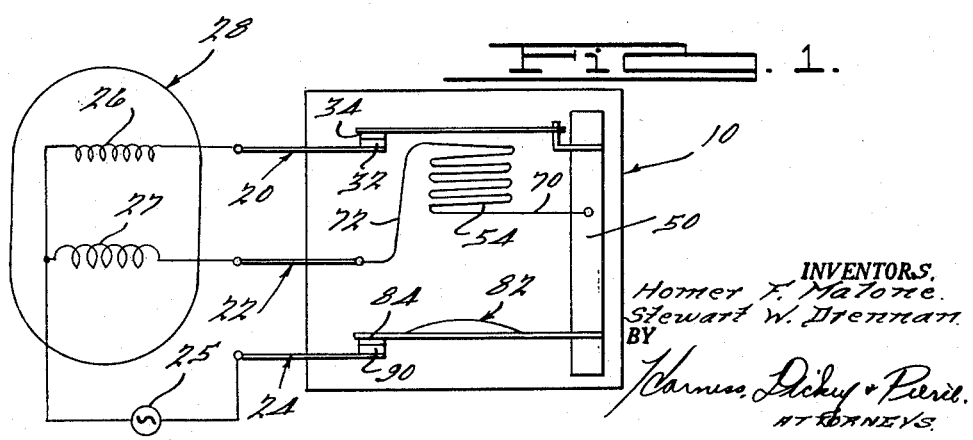
FIGURE 1 is a diagrammatic view of the electrical circuit wherein the combination motor start relay and overload protector of the instant invention has particular utility.

As best seen in FIGURE 1, the combination motor start relay and overload protector 10 is shown in the starting condition and operably connected to the motor 28. Upon energization of the motor 28 as by connection thereof to the source of electrical energy 25, the relatively high inrush current in the main winding 27 of the motor 28 creates a sufficient magnetic flux in the coil 54 to close the contacts 32 and 34 thereby to effect energization of the start winding 26 of the motor 28. At such time as current in the main winding 27 diminishes to a predetermined rated current, magnetic flux in the coil 54 is reduced to permit the armature 42 (FIGS. 2 and 7) to move under the bias of the spring 68, to the contacts' open condition thereby opening the energization circuit for the start winding 26.

Upon the occurrence of an overload in the main winding 27, the bimetal 82 heats sufficiently to effect snap-action thereof and separation of the contacts 84 and 90 thereby opening the energization circuit for the main winding 27.

Opening of the contacts 84 and 90 permits the end portion 110 of the manual operator 94 to slide outwardly of the housing 12 in the combination motor start relay and overload protector 10 under the bias of the spring 106, thereby precluding automatic re-start of the motor 28 upon cooling of the bimetal 82.

The novel orientation of the magnetic coil 54 and thermal responsive bimetal 80 of the combination motor start relay and overload protector 10 is such that both operating and manufacturing efficiency is maximized. For example, the coil 54 and bimetal 82 are supported in close proximate heat transfer relation so that the occurrence of relatively high current in the coil 54 due to an overload on the motor 28 and heat generated in the coil 54 is transmitted to the bimetal 82, which heat transfer is additive to the $I^2R$ losses in the bimetal 82 to materially accelerate the response thereof to the overload condition. This is particularly important since the bimetal 82 must be so calibrated as to be non-responsive to the relatively high starting currents characteristic of the motor 28.

Further, the plate 50 functions as a support and conductor for the armature 42, coil 54, and thermal-responsive bimetal 82. Thus, these elements can be formed as a subassembly and merely dropped into the base 14 of the housing 12.

It is to be understood that the specific construction of the improved combination motor start relay and overload protector herein disclosed and described is presented for the purpose of explanation and illustration and is not intended to indicate limits of the invention, the scope of which is defined by the following claim.

What is claimed is:

A combination start relay and overload protector for an electric motor comprising a generally rectangular housing, a plurality of terminal means on one side of said housing for connection to the start and run windings of an electric motor and to one side of a source of electrical energy, respectively, a pair of normally open electrical contacts, in said housing, a bus bar in said housing on the opposite side thereof from said terminal means, one of said normally open contacts being electrically connected to said start terminal and the other of said normally open contacts being electrically connected to said bus bar internally of said housing, a magnetic armature, supported by said bus bar and extending generally normal thereto the other of said normally open contacts being movable by said armature between the open and closed condition with respect to said one normally open contact, a magnetic coil electrically connected between said run winding terminal and said bus bar, said coil being operatively associated with said armature to effect movement thereof and said other normally open contact to the contact's closed condition upon the occurrence of a predetermined current in said coil, a substantially flat current responsive snap acting bimetallic member having one end portion electrically connected to and supported by said bus bar, a pair of normally closed electrical contacts, one of said normally closed contacts being electrically connected to said source terminal, the other of said normally closed contacts being supported by and electrically connected to the other end of said current responsive member, and a one piece manual operator having a substantially flat inner end portion in closely spaced parallel relation to said bimetallic member and a reset button portion extending outwardly of said housing, resilient means normally biasing said operator in one direction, the inner end portion of said operator being normally resiliently engaged with the other one of said normally closed pair of contacts, separation of said normally closed contacts permitting said operator to move in said one direction to a condition wherein the inner end portion thereof precludes closure of said normally closed contacts independently of the electrical conditions in the run and start windings and the reset button portion thereof indicates the open condition of said normally closed contacts.

References Cited in the file of this patent

UNITED STATES PATENTS

| | | |
|---|---|---|
| 2,282,249 | Schaelchlin | May 5, 1942 |
| 2,318,018 | Johns | May 4, 1943 |
| 2,487,422 | Carle | Nov. 8, 1949 |
| 2,488,818 | Kitman | Nov. 22, 1949 |
| 2,623,138 | Kumler | Dec. 23, 1952 |
| 2,711,503 | Elliot | June 21, 1955 |
| 2,731,587 | Brightman | Jan. 17, 1956 |